March 12, 1957   A. F. ALBANO   2,785,011
MIXING DEVICE
Filed May 17, 1955
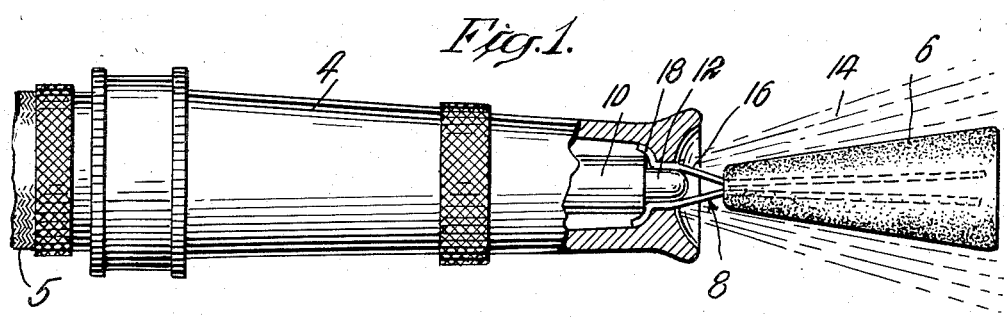
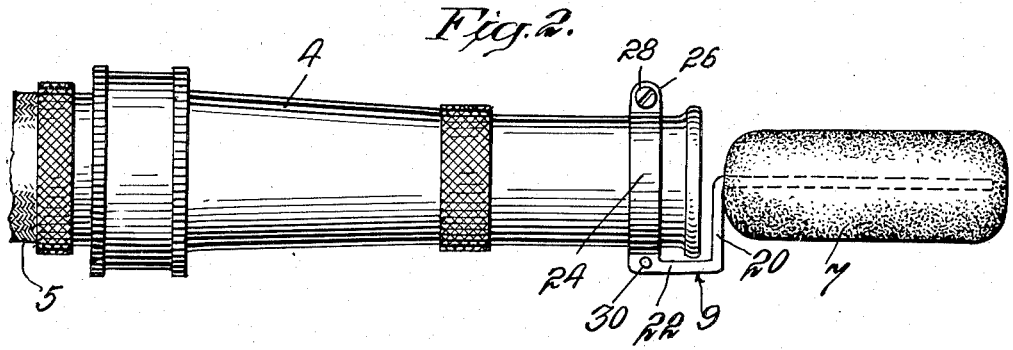
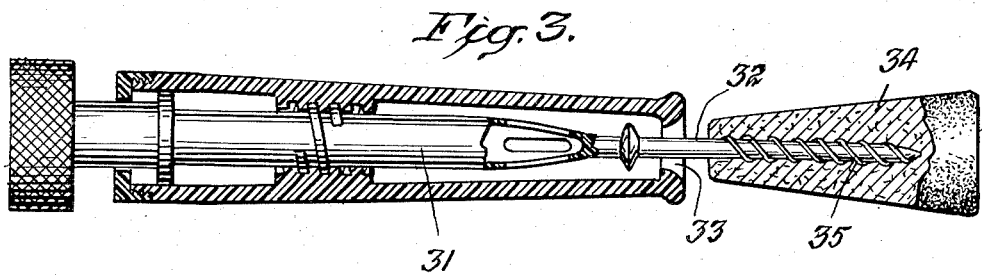
INVENTOR.
ALPHONSO F. ALBANO
BY
*Philip S. McHean.*
ATTORNEY United States Patent Office 2,785,011
Patented Mar. 12, 1957

2,785,011
MIXING DEVICE

Alphonso F. Albano, Poughkeepsie, N. Y.

Application May 17, 1955, Serial No. 508,895

1 Claim. (Cl. 299—83)

The invention disclosed in this patent application relates to mixing devices, and an important object of the invention has been to provide an improved mixing device for handling water as a olvent relative to any water soluble material desired to be used, as, for example, an insecticide, a poison, a disinfectant, a fertilizer, a plant food or the like.

Special objects of the invention are to provide a mixing device adapted for such utilities as those indicated when properly positioned relative to guiding means for a flow of water, and a device so constructed that it may be readily mounted in place to give the same said position.

Other special objects of the invention are to provide a mixing device as above, and one which is of light weight yet strong and sturdy and of simple low cost construction made of very few parts, and one which, moreover, is usable as explained when said water flow guiding means is a nozzle such as mounted on the discharge or water delivery end of a garden hose, even when said nozzle is any standard one purchasable in any ordinary neighborhood hardware store.

A further special object is not only to simplify the device to the utmost extent possible, but also at the same time to arrange that the part thereof constituted by said water soluble material is stationed at the exterior of said water flow guiding means, as the nozzle just mentioned, and there be no necessity to provide a foraminous or other container or holder for pocketing said material.

Other desirable objects and novel features of construction and combination and relation of parts through which the purposes of the invention are attained, are set forth and will appear more fully in the course of the following specification.

The drawing accompanying and forming part of the specification illustrates present commercial embodiments of the invention. Structure, however, may be modified and changed as regards the immediate illustration, all within the true intent and scope of the invention as hereinafter defined and claimed.

Fig. 1 in the drawing is a broken side elevation, showing a nozzle and a hose, with one of said embodiments of the invention mounted on said nozzle;

Fig. 2 is a side elevation showing the same nozzle and hose, with another of said embodiments mounted on the nozzle;

Fig. 3 is a broken longitudinal sectional view of another modification.

Broadly considered, the invention provides, particularly for use with a nozzle 4 such as is ordinarily mounted on the discharge or water delivery end of a garden hose 5 or the like, a device for modifying the water stream, spray or mist issuing from the nozzle in accordance with any selected manual adjustment of the latter, said device comprising a body of water soluble material such as illustratively indicated at 6 or 7, to be swept over by said water stream, spray or mist and consequently to act as a solute in modifying said stream, spray or mist, as desired, in combination with a single simple means, such as illustratively indicated at 8 or 9, for affording rigid support to said body while leaving exposed the entire outer surface thereof and at the same time adapted for substantially instantaneous yet secure attachment to the nozzle solely by engagement of said means with the outer end of the nozzle.

In Fig. 1 at 10 is indicated a member called the needle and which, housed in the nozzle, forwardly projects therein toward the discharge orifice at the outer end of the nozzle, and has at its forward end a combined shut-off valve member and diffuser 12; there being a threaded connection, not shown, between the needle and the sleeve member whereby one may be readily turned relative to the other to advance the member 12 toward or retract it from the said orifice as and to any extent desired. As the parts are shown in Fig. 1, there has been effected such a relative movement between the member 12 and the discharge orifice of the nozzle that a diverging water spray is being discharged as indicated at 14.

In Fig. 1, for optimum coaction with such a water spray, the body 6 of water soluble material according to the invention, desirably in highly compressed condition, is illustrated as of conical shape, and adapted in use to be positioned with its larger end remote from the nozzle. As said body 6, which aptly may be called a self-sustaining cartridge, is also shown, it has embedded therein lengths of two like bent wire members 16 constituting the aforesaid single means 8.

As will be noted, each wire member 16, where projected beyond the smaller end of the cartridge 6, is extended as an arm obliquely bent away from the length of said wire member buried in the cartridge, and at the outer end of said arm the wire member has a rounded terminal bend 18. The two wire members 16 as embedded in the cartridge 6 are disposed so that, as shown, they are in mutually symmetrical arrangement. With the wire members 16 of spring wire, as is preferred, said arms together with said terminal bends 18 provide a pair of spring tongs by way of which substantially instantaneously the means 8 is quickly and easily employable to mount the cartridge 6 as illustrated in Fig. 1 on the nozzle and in advance of the discharge orifice thereof. This mounting is facilitated, of course, if first the needle 10 be retracted to clear the member 10 about half-way out of the nozzle's discharge orifice; and after said mounting, return of the needle to the position illustrated effects a positive clamping action on the bends 18 to insure rigid support of the cartridge 6 by the means 8.

In Fig. 2 the self-sustaining cartridge 7 of water soluble material according to the invention is shown as of cylindrical form, with parts of the lengths of two components of its means 9 for attaching it to the nozzle 4 embedded in the cartridge. Also, as in the case of the embodiment of Fig. 1, the attaching means includes two parts, both alike, and both further, as in the case of the embodiment of Fig. 1, for detachable securement to the nozzle near the outer or orifice end thereof. Each of these two identical parts includes a terminal length shown in broken lines because buried in the cartridge 7, an adjoining length 20 extended downwardly at right angles to said buried length, and a third length 22 extended at right angles to said length 20 and away from the latter in offset prolongation of said buried length. Integral with the said buried length and the lengths 20 and 22 is an upward extension from the length 22 which over the main portion 24 thereof is outwardly arched and which just above said arched portion 24 terminates in a straight upstanding ear 26. Thus said upward extensions of the two identical parts provide the two halves of an ordinary hose clamp, couplable by a screw 28. As will be understood, said two identical parts are actually identical when considered only as stampings in the flat; and when fully fabricated, to arch their portions 24, they will be, as the terminology goes, one of the right-hand and the other of the left-hand. When said portions have been so arched, thereby to have the concavities of their archings face each other with the two parts assembled as indicated in Fig. 2, the two parts are desirably coupled at some suitable point, as by a rivet 30.

It will thus be seen from the foregoing that an exceedingly simple and inexpensive, but highly efficient mixing device has been provided, and one well adapted to attain all the objects of the invention, permitting use of a standard garden hose nozzle when desired, and without having to house any water soluble material inside the nozzle or other water flow guiding means or to provide a container exterior to said means for the water soluble material.

In the form of the invention shown in Fig. 3 the hose nozzle is modified to the extent of providing the inner, stem portion 31 of the same with an extension 32 projecting through the discharge orifice 33 and forming a support for the soluble plug or cartridge 34.

The supporting stem 32 may be screw-threaded, roughened or otherwise formed as indicated at 35 to firmly hold the soluble member, and the latter may be internally screw-threaded or otherwise suitably formed so that it may be quickly engaged and secured over the supporting stem.

In this last illustrated form of the invention the nozzle is permanently equipped with a support over which the dissolvable material may be engaged and the nozzle portion 4 is free at all times to be adjusted to the desired supply of water for dissolving the supported member.

What is claimed is:

For spraying garden products, a water spray nozzle having a screw base for connecting the same to an ordinary garden hose, an elongated solid body of water soluble material and a screw stem carried by and projecting from the end of said nozzle supporting said solid body of water soluble material spaced in front of the nozzle and substantially in line with and at the center of the stream of water issuing from the nozzle and whereby said body will be gradually dissolved by and become incorporated with the spray issuing from the nozzle and supplied by water delivered through the garden hose.

References Cited in the file of this patent

UNITED STATES PATENTS

| | | |
|---|---|---|
| 1,272,194 | Bickerton | July 9, 1918 |
| 1,815,197 | Gamel | July 21, 1931 |
| 1,979,755 | McDermott | Nov. 6, 1934 |
| 2,659,627 | McConnell | Nov. 17, 1953 |
| 2,734,632 | De Ment | Feb. 14, 1956 |